United States Patent [19]

Sierak et al.

[11] 4,053,764
[45] Oct. 11, 1977

[54] HIGHER-ORDER MODE FIBER OPTICS T-COUPLER

[75] Inventors: Paul F. Sierak, Utica; Allen E. Clough, Rome, both of N.Y.

[73] Assignee: The United States of America as represented by the Secretary of the Air Force, Washington, D.C.

[21] Appl. No.: 619,111

[22] Filed: Oct. 2, 1975

[51] Int. Cl.² ............................ G02B 5/14; H01J 5/16; H01J 39/12
[52] U.S. Cl. .................................. 250/227; 350/96 C
[58] Field of Search .............. 250/227, 208; 350/96 C, 350/96 WG

[56] References Cited

U.S. PATENT DOCUMENTS

| 2,967,664 | 1/1961 | Ress | 250/227 |
| 3,353,026 | 11/1967 | Israely | 250/227 |
| 3,455,625 | 7/1969 | Brumley et al. | 350/96 C |
| 3,728,521 | 4/1973 | Borough | 250/227 |
| 3,737,629 | 6/1973 | See | 250/227 |
| 3,901,582 | 8/1975 | Milton | 350/96 C |
| 3,912,364 | 10/1975 | Hudson | 350/96 C |

*Primary Examiner*—Alfred E. Smith
*Assistant Examiner*—David K. Moore
*Attorney, Agent, or Firm*—Joseph E. Rusz; George Fine

[57] ABSTRACT

A higher order mode, simplex, fiber optics T-coupler is based on using only the higher order lossy modes of single fiber optics whether the cable is single fiber or a fiber bundle. This allows for T-couplers that discriminate on modes.

2 Claims, 7 Drawing Figures

HIGHER-ORDER MODE FIBER OPTICS T-COUPLER

STATEMENT OF GOVERNMENT INTEREST

The invention described herein may be manufactured and used by or for the Government for governmental purposes without the payment of any royalty thereon.

BACKGROUND OF THE INVENTION

One of the main components in fiber optics based communications networks is the T-coupler. Most T-couplers are designed for fiber bundle implementation. In one type, the incident light from the whole input port bundle, which includes both low order and the lossy higher order modes from each of the separate fiber optic strands, is permanently split and coupled into the other T-coupler ports. In another type the strands instead of depending on cable furcation or gross division of light without regard to the order of the mode of propagation is based on using only the higher order, lossy modes of single fiber optics whether the cable is single fiber or fiber bundle. This allows for T-couplers that discriminate on modes, are applicable to single fiber operation, are small in size or weight, allow for easy alignment, and for direct optical to electrical conversion as compared to present T-couplers.

An important feature of this invention is the use of only the lossy higher order propagation modes of light, in fiber optic single strand or bundled cable, to provide an energy basis for the simplex T-coupler. An additional feature is that the degree of coupling to only the higher order modes can easily be controlled after the coupler is installed. Also the concept is applicable to either bundle, without separate fiber separation or to single fiber cable.

It is emphasized that the invention eliminates the restrictions on present fiber optic communications networks utilizing T connectors such as number of users and, once installed, on line control of the degree of coupling within the T-coupler. The control over the degree of coupling enables easy system optimization with regard to energy distribution among users when adding or substracting users. Coupling via only the higher order modes allows the maintenance of a low throughout loss while allowing for more T-couplers to be placed in series than presently achievable.

It is noted that the efficient energy utilization and applicability to single fiber cable encourages the use of single fiber employments with many T-coupled users with its consequent weight, cost and volume reductions as compared to fiber bundle installations on USAF bases and aircraft data bus applications.

SUMMARY OF THE INVENTION

A higher order mode, simplex, fiber optic T-coupler is provided. There is utilized only the lossy higher order propagation modes of light, in fiber optic strand or bundled cable, to provide an energy basis for the simplex T-coupler. This allows for T-couplers that discriminate on modes. An additional feature is that the degree of coupling to only higher order modes are easily controlled after the coupler is installed. There is also provided a direct optical to electrical conversion.

DESCRIPTION OF THE DRAWINGS

FIG. 1b shows an end view of FIG. 1a;

DETAILED DESCRIPTION OF THE PREFERRED EMBODIMENTS

Figure 1A:
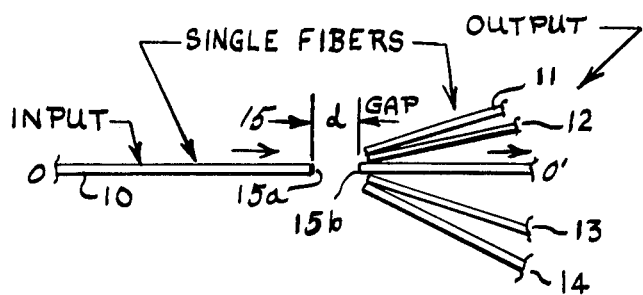
FIG. 1a shows a side view of a single fiber optical to optical domain unidirectional embodiment.
Figure 1B:
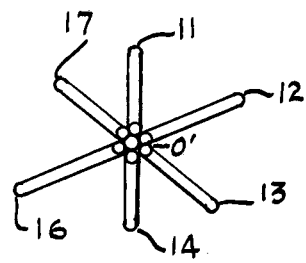

Now referring in detail to FIG. 1a, there is shown a single fiber optical to optical domain unidirectional T-coupler embodiment. The input optical data signal travels along main line 10 from 0 to 0'. The degree of coupling of the higher order modes into the single fiber optical channels (lines) 11, 12, 13, 14 is accomplished by varying distance $d$ of gap 15 and adjusting the angle of single fiber lines 11, 12, 13 and 14 with respect to main line 10. Gap 15 is shown in conjunction with endfaces 15a and 16b. The higher order, larger angle modes couple to optical fiber lines 11, 12, 13 and 14 since they enter the gap region at an angle as compared to line 10. The receiving channels (lines) 11, 12, 13 and 14 can either be routed to users if sufficient light is available in each or can be confined to provide a usable signal level. It is noted that FIG. 1a shows an end view of FIG. 1a but additional channels (lines) 16 and 17 are shown.

Figure 2:
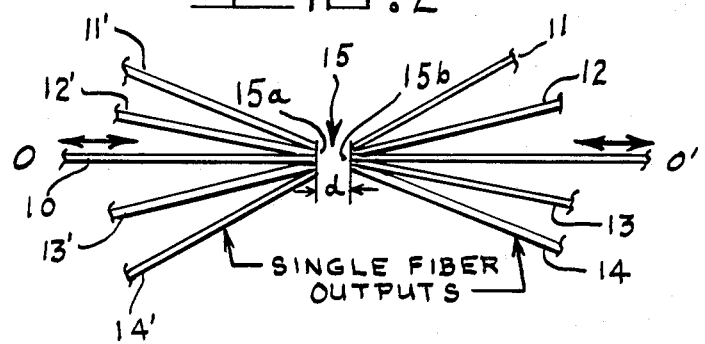
FIG. 2 shows a single fiber optical to optical domain bidirectional embodiment.

Now referring to FIG. 2, there is shown a single fiber optical to optical domain bidirectional embodiment. Elements in FIG. 2 identical to that of FIG. 1a are designated with the same characters. This embodiment is the symmetrical complement of that shown in FIG. 1a. Data in this embodiment can be coupled out with data proceeding from either 0 to 0' or 0' to 0 by receiving channels (lines) 11, 12, 13, 14 and receiving channels (lines) 11', 12', 13', 14', respectively.

Figure 3:
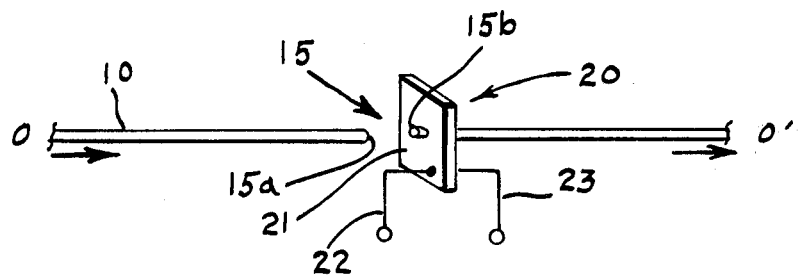
FIG. 3 shows a single fiber optical to electrical domain unidirectional embodiment.

Referring to FIG. 3, there is shown a single fiber optical to electrical domain unidirectional T-coupler embodiment. Elements identical to that shown in FIG. 1a are designated by identical characters. In this coupler, the lower order, higher energy, smaller angle data from 0 transverses the region at gap 15 at a larger angle compared to line 10 and impinges upon large photodetector 20. Photodetector 20 is so constructed that hole 21 is incorporated through it so that single fiber line 10 is inserted axially through the center of photodetector 20. To photodetector 20 are connected electrical output lines 22 and 23. In place of photodetector 20 there may be substituted a diode array symmetrically arranged in the same plane as the single photodetector. After impinging upon the photodetector or photo diode array, the energy is converted directly into the electrical domain and coupled out of the T.

Figure 4:
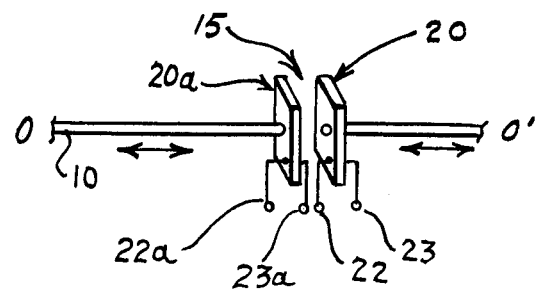
FIG. 4 shows a single fiber optical to electrical domain bidrectional embodiment.

Now referring to FIG. 4, there is shown a single fiber optical to electrical domain bidirectional T-coupler embodiment. Elements identical to that of FIG. 3 are designated with identical characters. This embodiment is the complement to that shown in FIG. 3. Data in the form of output electrical signals can be coupled out with optical data signals proceeding either from 0 to 0' or 0' to 0. There has been included the additional photodetector 20a and its electrical output leads 22a and 23a. Thus data going from 0' to 0 is coupled out electrically by way of photodetector 20a and its associated leads 22a and 23a. In place of photodetector 20a, there may be utilized a diode array symmetrically arranged in the same plane as the single photodetector.

Figure 5:
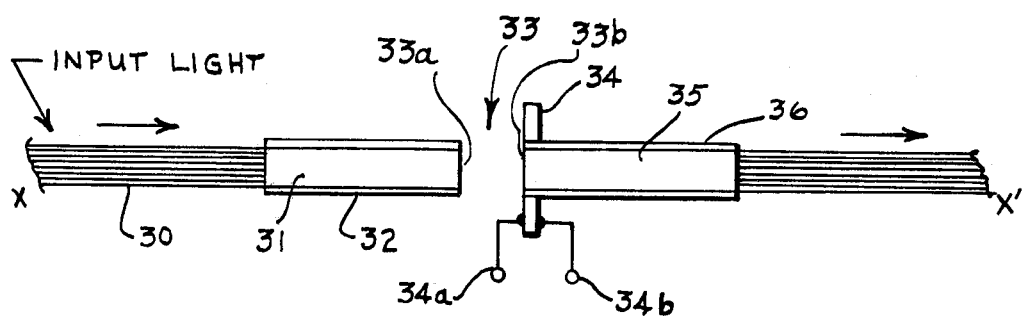
FIG. 5 shows a fiber bundle to electrical unidirectional embodiment.

Referring to FIG. 5, there is shown in fiber bundle optical to electrical unidirectional T-coupler embodiment. The input light from fiber bundle 30 is fed into mixing rod 31 having cladding 32. This combination is generally known as a cladded mixing rod. The cladded mixing rod with the proper choice of length can be looked upon as a large single fiber. The distance between endfaces 33a and 33b form gap 33. The higher mode, higher angle energy enters gap 33 and impinges upon photodetector 34 which is placed perpendicular to the axis of X-X'. Output leads 34a and 34b are associated with photodetector 34 and provide an electrical signal therefrom representative of the higher mode, higher angle energy impinging on photodetector 34. In place of photodetector 34, there may be substituted a diode array symmetrically arranged in the same plane as the single photodetector. Photodetector 34 has a hole therethrough in which is fitted the combination of mixing rod 35 and cladding 36. This combination is known as a cladded mixing rod which encompasses the extension of fiber bundle 30. Thus the electrical signal from the higher mode, higher angle energy is available at leads 34a and 34b and the input light at X is available at X'.

Figure 6:
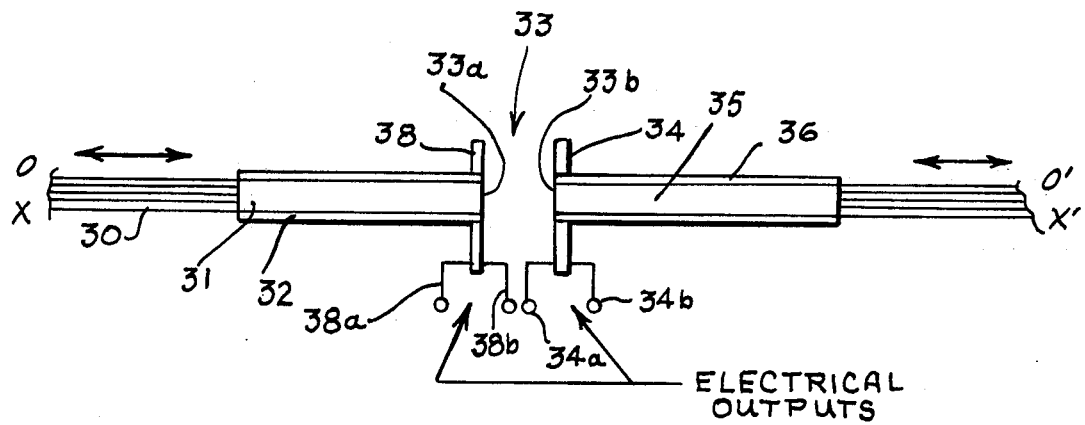
FIG. 6 shows a fiber bundle optical to electrical bidrectional embodiment.

Now referring to FIG. 6, there is shown a fiber bundle to electrical bidrectional T-coupler embodiment. This embodiment is the symmetrical complement of that shown in FIG. 5. Elements identical to that shown in FIG. 5 are designated with the same characters. There is added photodetector 38 and associated electrical leads 38a and 38b. Data in this embodiment can be coupled out with the data proceeding from either X to X' or X' to X.

What is claimed is:

1. A higher order mode fiber optic T-coupler being comprised of a single main optical fiber having first and second ends and a predetermined axis, said first end receiving a first input optical light signal for transmission toward said second end, said single main optical fiber having exclusively an air gap therein, said gap being defined by a first and second separated endfaces in said single main optical fiber, and a first multiplicity of exclusively single fiber optical channels positioned at said second endface of said gap, each of said single optical channels being at a different angle to said single main optical fiber, each of said angular optical channels consisting of a single optical fiber, the variation of distance of said gap and the adjustment of said angle determining the degree of coupling of said higher modes into said optical channels.

2. A higher order mode fiber optic T-coupler as defined in claim 1 further including a second input optical light signal received at said second end of said single main optical fiber for transmission toward said first end, a second multiplicity of exclusively single optical channels positioned at said first endface defining said gap, each of said second multiplicity of single optical channels being at a different angle to said single main optical fiber, the degree of said angle determining the degree of coupling of said higher order modes into said second multiplicity of optical channels.

* * * * *